Jan. 31, 1956 K. H. SCHWARZ 2,732,853
PRESSURE RELIEF DEVICE
Filed Nov. 14, 1951
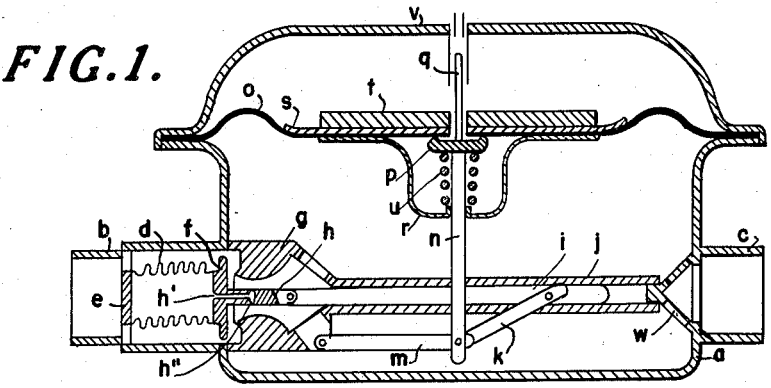
FIG.1.
FIG.2.A
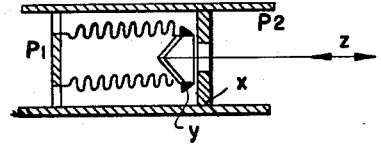
FIG.2.B
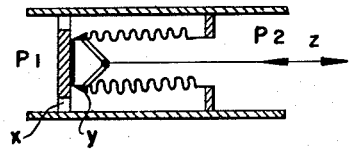
FIG.3.A
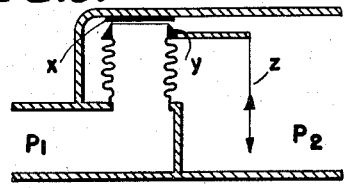
FIG.3.B
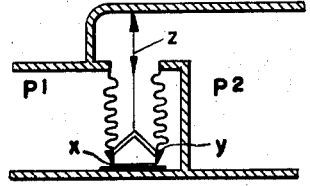
FIG.4.A
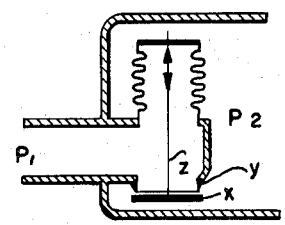
FIG.4.B
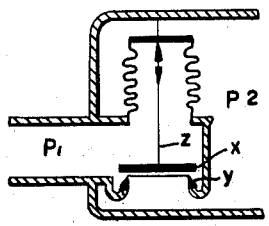
INVENTOR
KARL HERMANN SCHWARZ.
BY Cushman, Darby & Cushman
ATTORNEY United States Patent Office
2,732,853
Patented Jan. 31, 1956

2,732,853

PRESSURE RELIEF DEVICE

Karl Hermann Schwarz, Osnabruck, Germany, assignor to G. Kromschroder Aktiengesellschaft, Osnabruck, Germany Application November 14, 1951, Serial No. 256,213

Claims priority, application Germany November 15, 1950

9 Claims. (Cl. 137—116.5)

The invention relates to a pressure relief device and, more particularly, to such a device for use in a valve of a pressure regulator loaded with different pressures.

The problem to be solved and the solution in accordance with the invention are described in the following specification as applied to a pressure regulator, though the invention is not limited to pressure regulators.

It is well-known in the art that pressure regulators have been made in which the valve is relieved of the inflow pressure by means of a second valve (double seat valve) or by means of a balance membrane or diaphragm dimensioned according to the effective surface of the valve. A certain amount of independence of the back pressure from varying inflow pressure has also been obtained by the use of multi-stage regulators. However, multi-stage regulators have the disadvantage of complex constructions. Regulators with double seats do not shut-off tightly in the close position (at zero consumption) while regulators with valve relief by means of balance membranes are not applicable at high inflow pressures by reason of the limitations imposed by the materials of which they are constructed.

An object of the invention is to provide a pressure relief device free of these disadvantages and which is particularly adapted for use with valves of pressure regulators loaded with different pressures. The invention is characterized in that a resilient or spring means, for example, a bellows, known per se is provided as means for relieving pressure. Preferably, a spring means associated with a valve seat and a valve disk is carried horizontally or vertically in a casing in such a manner, that pressure variations within or outside of the spring means will result in little or no change in the length of the spring means. The apparatus is constructed in such manner that the inflow pressure acts within and the back pressure outside the spring means, or vice versa. One end of the valve body can be formed as the valve disk or as the valve seat, or can be connected therewith. Preferably, the diameter of the valve seat is equal or almost equal to the diameter of the cylindrical ends of the spring means. The valve seat of the valve controlled by the spring means is formed as a venturi nozzle, and the space at the narrowest place of the nozzle communicates with that side of the spring means which is loaded by the control pressure.

In accordance with one embodiment of the invention as applied to a pressure regulator with an operating diaphragm or membrane, the movement of the operating membrane and the movement of the valve controlled by the spring means are mechanically coupled in such a manner that, with a uniform change in the position of the membrane, there is obtained a non-uniform change in the position of the valve, said change increasing with increased flow of fluid (larger openings).

Several examples of the invention are illustrated in the drawings, in which

Figure 1 is an embodiment applied to a pressure regulator; and

Figures 2 to 4 are diagrammatic views of further embodiments of the spring means.

The regulator, shown in Figure 1 comprises a lower housing $a$ having an inlet $b$ and a discharge $c$. In an enlarged portion of the inlet $b$, there is provided a spring means $d$, the bottom $e$ of which is firmly secured at the inlet $b$. A valve disk $f$ is mounted on the other end of the spring means $d$, said valve disk being adapted to be moved toward and away from a valve seat $g$ by a rod. The body of the valve seat is made in the form of a venturi nozzle. The rod comprises an element $h$ having a longitudinal passage $h'$ and two transverse passages $h''$, and an element $i$ connected to said element $h$, said element $i$ being adapted to be moved in longitudinal direction in a guide member $j$. The right end of the guide member $j$ is supported by means of a supporting element $w$. The rod elements $h$, $i$ are moved longitudinally by means of an actuating rod $n$ connected to an operating membrane $o$ by link $m$ pivotally mounted on the guide member $j$ and by a link $k$. A valve seat $p$ and a guide pin $q$ are mounted on the actuating rod $n$. The membrane $o$ with the membrane disk $s$ and a load $t$ is tightly pressed in sealing engagement against the valve seat $p$ by means of a bridge member $r$ and a spring $u$. The guide pin $q$ slides in the cover $v$ provided with a guide sleeve and a vent hole.

The operation of the regulator is as follows.

In the non-operative condition, the load $t$ moves the links or arms $k$ and $m$ from their extended positions to an inclined position by means of the rod member $n$, and thereby moving the rod $i$ toward the inlet $b$, whereby the valve is opened.

If a fluid be flowing through the regulator, then the operative condition is established as follows:

The fluid can flow almost without hindrance through the inlet $b$ exteriorly of the spring means $d$ between valve disk $f$ and valve seat $g$ into the space below the operating membrane $o$ and flowing from there to the consumer through the discharge $c$. The pressure produced by this flow lifts the operating membrane $o$ together with the load $t$ and the rod $n$ in a manner known in the art, whereby the inclined links $k$ and $m$ are extended and the rod comprising the elements $i$ and $h$ is moved toward the outlet $c$ and the valve $f$ is closed when the consumption is zero. The space within the spring means $d$ communicates with the space below the operating membrane $o$ by the longitudinal and the two transverse passages in the element $h$ of the rod, so that, when the consumption is zero, and the valve is closed, equal pressure conditions are present in the two spaces. With increasing consumption, the pressure below the operating membrane $o$ is decreased in known manner, the weight on the valve lowers the rod $n$, and the arms $k$ and $m$ are moved to an inclined position, the valve $f$ is opened and permits the fluid to flow until the back pressure, determined by the load $t$ is again obtained. With increased consumption, there is simultaneously produced in the narrowest portion of the valve seat $g$ (formed as a venturi nozzle) a reduction of pressure (vacuum) relative to the space below the operating membrane $o$, by reason of the increased velocity of flow. This pressure reduction is transmitted to the space within the spring means $d$ through the transverse and longitudinal passages in the element $h$ of the operating member, causing a further opening of the valve, thereby making it possible to obtain higher pressures at increased flows.

A similar action is, furthermore, obtained by mechanical means due to the fact that the transmission of the perpendicular control movement of the membrane $o$ to the horizontal displacement of the rod takes place according to a sine law. Unequal displacements of the valve position are produced by equal changes in the position of the membrane and, indeed, increase with greater flow volumes, whereby relatively higher pressures are obtained with increased flow volumes. Further, in case of zero consumption, a high closing pressure of the valve, assuring a tight seal, is simultaneously obtained as a result of the large power transmission ratio due to the extending arms $m$ and $k$ transmission system which operates according to a sine law.

In case of breakdown of service, when the back pressure exceeds a certain value, the membrane $o$ is lifted in a known manner with respect to the end position of the rod $n$ overcoming the force of the spring, whereby the fluid producing the excess pressure can escape through the valve with the open valve seat $p$ and through the hole provided in the cover $v$.

Independence of the valve system from varying inflow pressures is obtained, in accordance with this invention, in the case of embodiment shown in Figure 1, in the following manner: The diameter of the valve seat $g$ corresponds exactly to the diameter of the cylindrical ends of the spring means $d$. The bottom of the spring means $d$ is rigidly secured to the casing $a$ at the inlet $b$. The inflow pressure acting on the outside and the back pressure at the inside of the spring means $d$ is taken up by the casing $a$. The inflow pressure acting on the corrugations of the spring means $d$ and on the two sides of the valve disk $f$ is balanced independently of the value of the inflow pressure. No change in the length of the spring means is therefore caused by the inflow pressure. Such change in the length of the spring means $d$ is produced by the rod system, only, by means of the membrane which is controlled by the back pressure and by means of the pressure difference in front and behind the valve disk $f$ produced by the venturi nozzle-like valve seat $g$.

Further examples of spring means are shown in the embodiments of Figures 2a, 2b, 3a, 3b and 4a, 4b. In these embodiments, the valve system is likewise completely relieved from the pressures and pressure variations present within and outside of the spring means. The following reference characters are used in all of the figures:

$P_1$ = Inflow pressure
$P_2$ = Back presure
$x$ = Valve disk
$y$ = Valve seat
$z$ = Transmission of displacement to the valve.

In all of the embodiments, the diameter of the valve seat has to match the diameter of the cylindrical ends of the spring means in order to obtain an absolute relief of the valves. Through differences between the diameters of the valve seat and the cylindrical ends of the spring means, there can be produced a tendency to increase the opening or increase the closing can be obtained with increasing inflow or control pressures, whereby the position of the control curves can be predetermined as desired for different inflow pressures. A horizontal disposition of the spring means is shown in Figures 2a and 2b, whereby the inflow pressure is exerted on the outside of the spring means and the controlled pressure in the interior. In these two figures, the control movements for "opening" and "closing" are in opposite direction.

Figures 3a and 3b illustrate a vertical disposition of the spring means. In these embodiments also, the control movements of the valves for "opening" and "closing" are in opposite directions. In the embodiment of Figure 3a, the inflow pressure is within the spring means, while the mechanism for the displacement is provided outside of the valve seat. In contrast to Figure 3a, the inflow pressure in the embodiment of Figure 3b, is acting outside and the control pressure within the spring means.

A vertical arrangement of the spring means for producing control movements in opposite direction is shown in the embodiments of Figures 4a and 4b. In both these figures, the inflow pressure is acting within and the back pressure on the outside of the spring means. The relief of the valve is obtained in these two embodiments by reason of the fact that the pressures acting on the valve disks and the ends of the spring means are balanced and are, thereby, rendered ineffective.

The advance obtained by the invention lies in the provision of a spring means used in such a manner that variations in pressure inside or outside of the spring means can result in little or no change in the length of the spring means. Therefore, the invention is particularly useful in pressure regulators for obtaining a relief of the valve as well as in many other applications.

I claim:

1. A pressure regulating device for controlling the flow of fluid in a system comprising a housing, a pressure operated membrane mounted in said housing and defining an upper chamber and a lower pressure chamber, said housing having an inlet port and an outlet port in said pressure chamber, valve means mounted in said inlet port for controlling the flow of fluid through said device and including a valve seat and a valve disk, a cylindrical bellows connected at one end thereof to said valve means and at the other end thereof to said housing and having one side thereof in communication with the pressure of the inlet fluid, said bellows having a diameter at its ends substantially equal to the diameter of said valve seat whereby varying of pressure of the inlet fluid acting on said bellows is balanced independently of said valve means, a venturi nozzle associated with said valve means, means placing the other side of said bellows in communication with said venturi nozzle, said last mentioned means being moved relative said venturi nozzle upon movement of said valve means, and mechanical linkage means interconnecting said valve means and said pressure operated membrane, said mechanical linkage means being arranged to open said valve means in increasing increments of movement with equal increments of movement of said pressure operated membrane and to close said valve means in decreasing increments of movement with equal increments of movement of said pressure operated membrane and said bellows cooperating with said pressure operated membrane to open and close said valve means.

2. A pressure regulating device of the type in claim 1 wherein said valve seat is connected to said venturi nozzle and said valve plate is mounted on one end of said bellows.

3. A pressure regulating device of the type in claim 1 wherein said cylindrical bellows is mounted horizontally of said housing and is connected to said valve seat, said valve seat being annular and having a sharp edge for engaging said valve plate.

4. A pressure regulating device of the type in claim 1 wherein said cylindrical bellows is mounted vertically of said housing and is connected to said valve seat, said valve seat being annular and having a sharp edge for engaging said valve plate.

5. A pressure regulating device of the type in claim 1 wherein the interior of said bellows is in communication with the pressure of the inlet fluid and the exterior of said bellows is in communication with the pressure in said pressure chamber.

6. A pressure regulating device of the type in claim 5 wherein said bellows is mounted vertically of said housing and is connected to said valve seat, said valve seat being annular and having a sharp edge for engaging said valve plate.

7. A pressure regulating device for controlling the flow of a fluid in a system comprising a housing, a pressure operated membrane in said housing and defining an upper chamber and a lower pressure chamber, said housing having an inlet port and an outlet port in said pressure chamber, valve means connected in said inlet port for controlling the flow of liquid through said device, said valve means including a venturi nozzle shaped valve seat mounted in said housing and communicating with said pressure chamber and a valve disk cooperating with said valve seat and having a stem extending through said valve seat, a cylindrical bellows connected at one end thereof to said valve disk and at the other end thereof to said housing, said bellows having the diameter of its ends substantially equal to the diameter of said valve seat whereby varying of pressure of the inlet fluid acting on said bellows is balanced independently of said valve means, said bellows having the exterior thereof in communication with the pressure of the inlet fluid, means placing the interior of said bellows in communication with the venturi nozzle of said valve seat, said means being movable longitudinally with respect to said venturi nozzle including a longitudinal passage in the stem of said valve plate and a transverse passage communicating with said longitudinal passage and the venturi nozzle of said valve seat, and mechanical linkage means interconnecting said valve stem with said pressure operated membrane, said mechanical linkage means being arranged to open said valve means in increasing increments of movement with equal increments of movement of said pressure operated membrane and to close said valve means in decreasing increments of movement with equal increments of movement of said pressure operated membrane and said bellows cooperating with said pressure membrane to open and close said valve means.

8. A pressure regulating device of the type in claim 7 wherein said upper chamber is vented to atmosphere and said pressure operated membrane is provided with an aperture and a weight, a spring operated valve element mounted on the underside of said membrane and normally closing said aperture, said spring operated valve element being operative to open position by an excessive pressure in said pressure chamber whereby said excessive pressure can be relieved through said upper vented chamber to atmosphere.

9. A pressure regulating device of the type in claim 1, wherein said upper chamber of said housing is vented to atmosphere and including a second valve means normally closed and connecting for communication said upper vented chamber with said lower pressure chamber, said second valve means operative to open position by excessive pressure in said pressure chamber whereby said excessive pressure can be released through said upper vented chamber to atmosphere.

References Cited in the file of this patent

UNITED STATES PATENTS

| | | |
|---|---|---|
| 312,543 | Westinghouse, Jr. | Feb. 17, 1885 |
| 331,544 | Reinecke | Dec. 1, 1885 |
| 374,485 | McGann | Dec. 6, 1887 |
| 389,032 | Westinghouse, Jr. | Sept. 4, 1888 |
| 1,646,640 | Daniel | Oct. 25, 1927 |
| 1,679,215 | Goldkamp | July 31, 1928 |
| 1,995,480 | Murphy | Mar. 26, 1935 |
| 2,330,704 | Grise | Sept. 28, 1943 |
| 2,412,490 | Biggle | Dec. 10, 1946 |
| 2,498,631 | Ahlport | Feb. 28, 1950 |

FOREIGN PATENTS

| | | |
|---|---|---|
| 489,565 | Germany | of 1930 |
| 721,326 | Germany | June 2, 1942 |